United States Patent
Miyakoshi

(10) Patent No.: US 7,909,317 B2
(45) Date of Patent: Mar. 22, 2011

(54) DOCUMENT FEEDING DEVICE AND IMAGE FORMING APPARATUS INCLUDING THE SAME

(75) Inventor: Naoto Miyakoshi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 12/541,675

(22) Filed: Aug. 14, 2009

(65) Prior Publication Data

US 2010/0123282 A1    May 20, 2010

(30) Foreign Application Priority Data

Nov. 20, 2008   (JP) .................... 2008-296532

(51) Int. Cl.
*B65H 85/00*    (2006.01)
(52) U.S. Cl. .................. 271/3.14; 271/65; 271/264
(58) Field of Classification Search .......... 271/186, 271/264, 65, 301, 3.14; 399/367, 373, 374, 399/365; 358/498
See application file for complete search history.

(56) References Cited

U.S. PATENT DOCUMENTS

| | | | |
|---|---|---|---|
| 6,877,742 B2* | 4/2005 | Nishikata et al. | 271/264 |
| 7,021,618 B2* | 4/2006 | Watanabe et al. | 271/3.14 |
| 7,021,619 B2* | 4/2006 | Watanabe et al. | 271/3.14 |
| 7,032,900 B2* | 4/2006 | Nishikata et al. | 271/264 |
| 2003/0141654 A1* | 7/2003 | Nishikata et al. | 271/264 |
| 2004/0217537 A1* | 11/2004 | Ohama | 271/3.14 |
| 2005/0163546 A1* | 7/2005 | Kim | 399/367 |
| 2008/0158621 A1* | 7/2008 | Hamada et al. | 358/498 |
| 2008/0180763 A1* | 7/2008 | Nishizawa et al. | 358/498 |
| 2008/0304116 A1* | 12/2008 | Lee | 358/498 |
| 2010/0060956 A1* | 3/2010 | Harada | 358/498 |
| 2010/0061782 A1* | 3/2010 | Harada | 399/380 |
| 2010/0158591 A1* | 6/2010 | Otaki et al. | 399/364 |

FOREIGN PATENT DOCUMENTS

| JP | 05-116797 | 5/1993 |
|---|---|---|
| JP | 2010030718 A * | 2/2010 |

* cited by examiner

*Primary Examiner* — Kaitlin S Joerger
(74) *Attorney, Agent, or Firm* — K&L Gates LLP

(57) ABSTRACT

A document feeding device includes a pressing member that extends in a document conveying space from a document conveying surface of an outer conveying guide member having a counter conveying roller, of two conveying guide members provided in a first document conveying path such as to oppose front and back sides of a document, toward a document conveying surface of an inner conveying guide member. The pressing member extends in a document width direction perpendicular in a document feeding direction with its leading end extending in a conveying space from one of the conveying surfaces toward the other conveying surface. This structure prevents a large displacement of the document even when the document is released from the nip between conveying rollers or passes between the two conveying guide members provided in the document feeding direction.

7 Claims, 6 Drawing Sheets

[FIG.1]
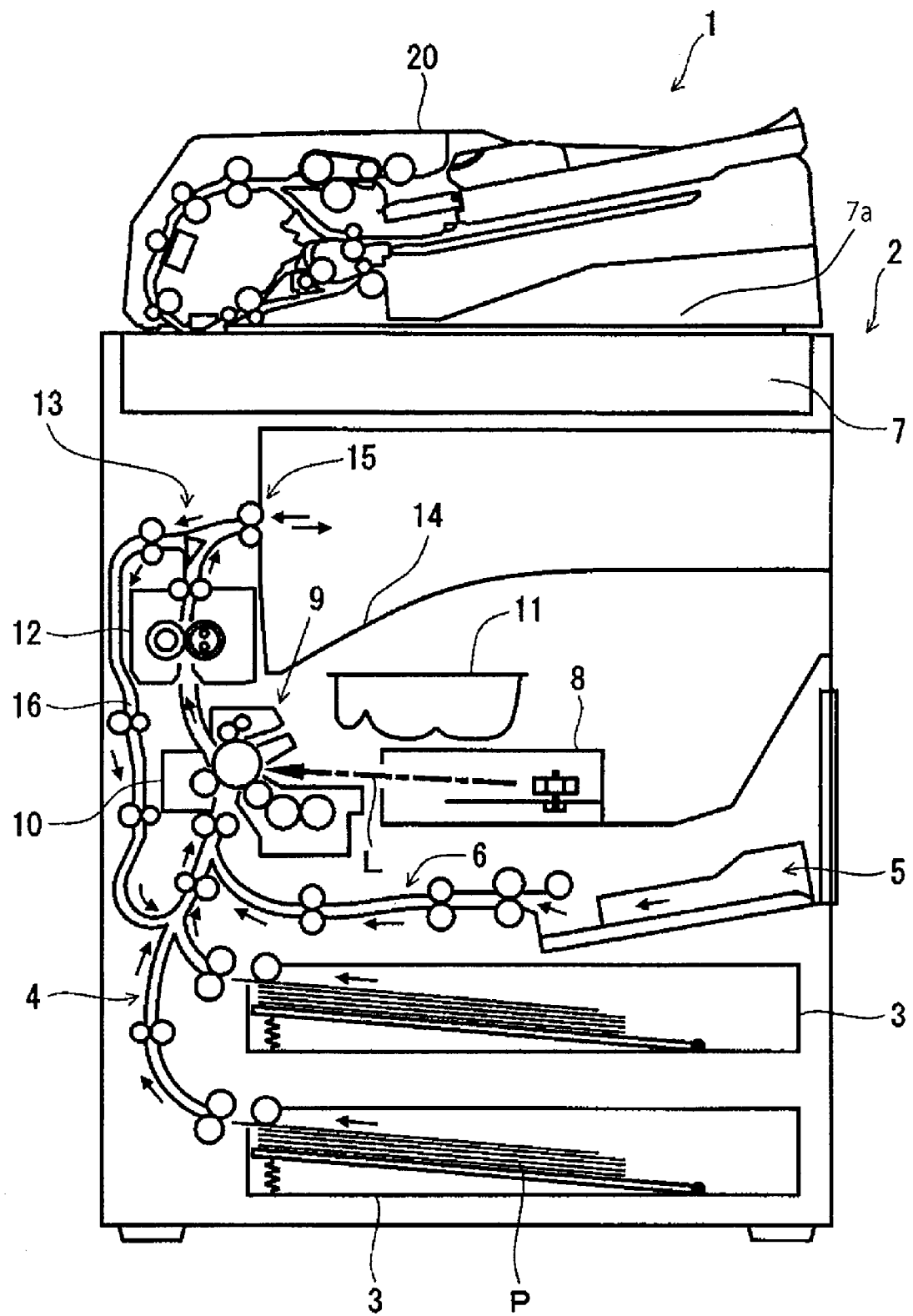

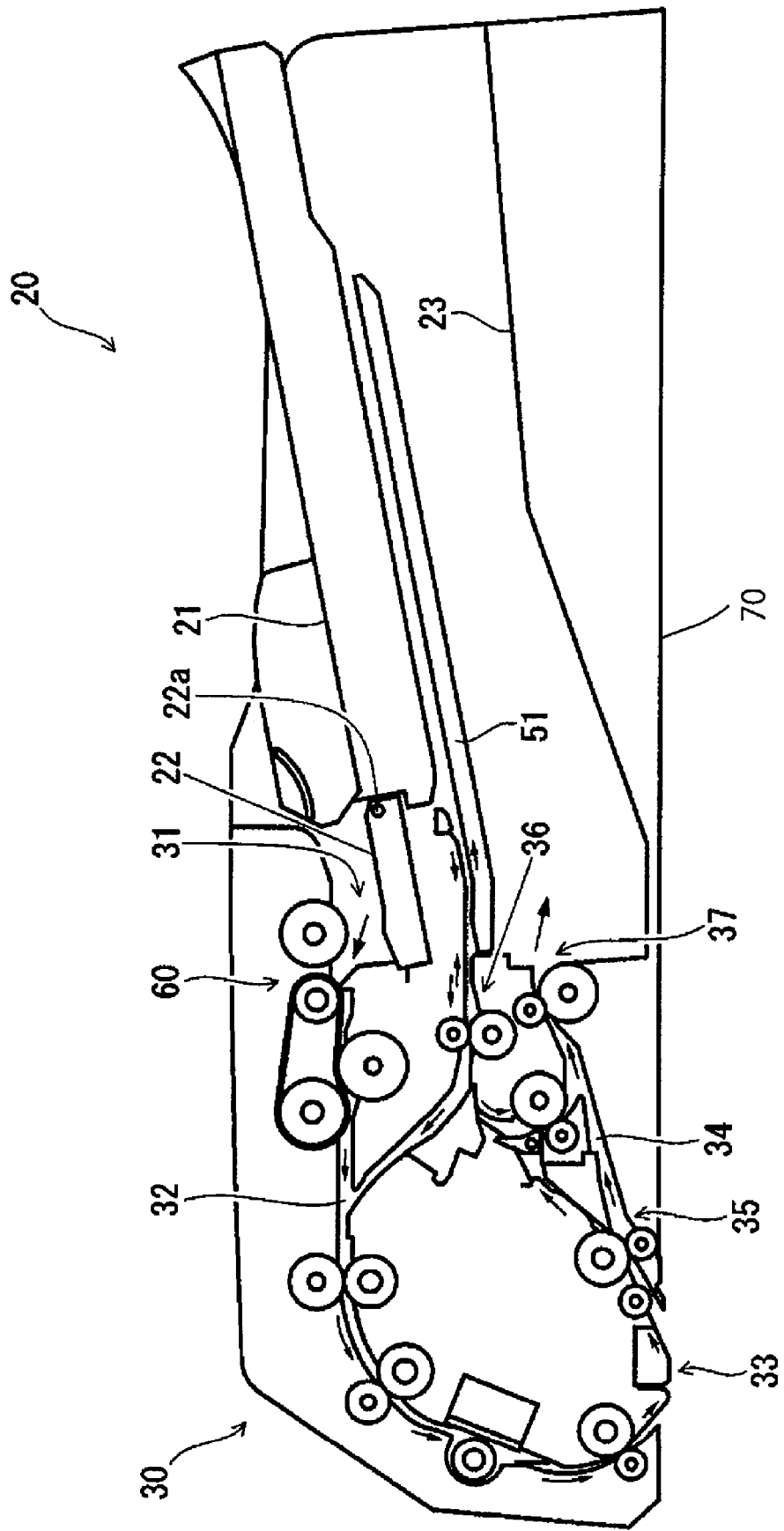
[FIG.2]

[FIG.3]
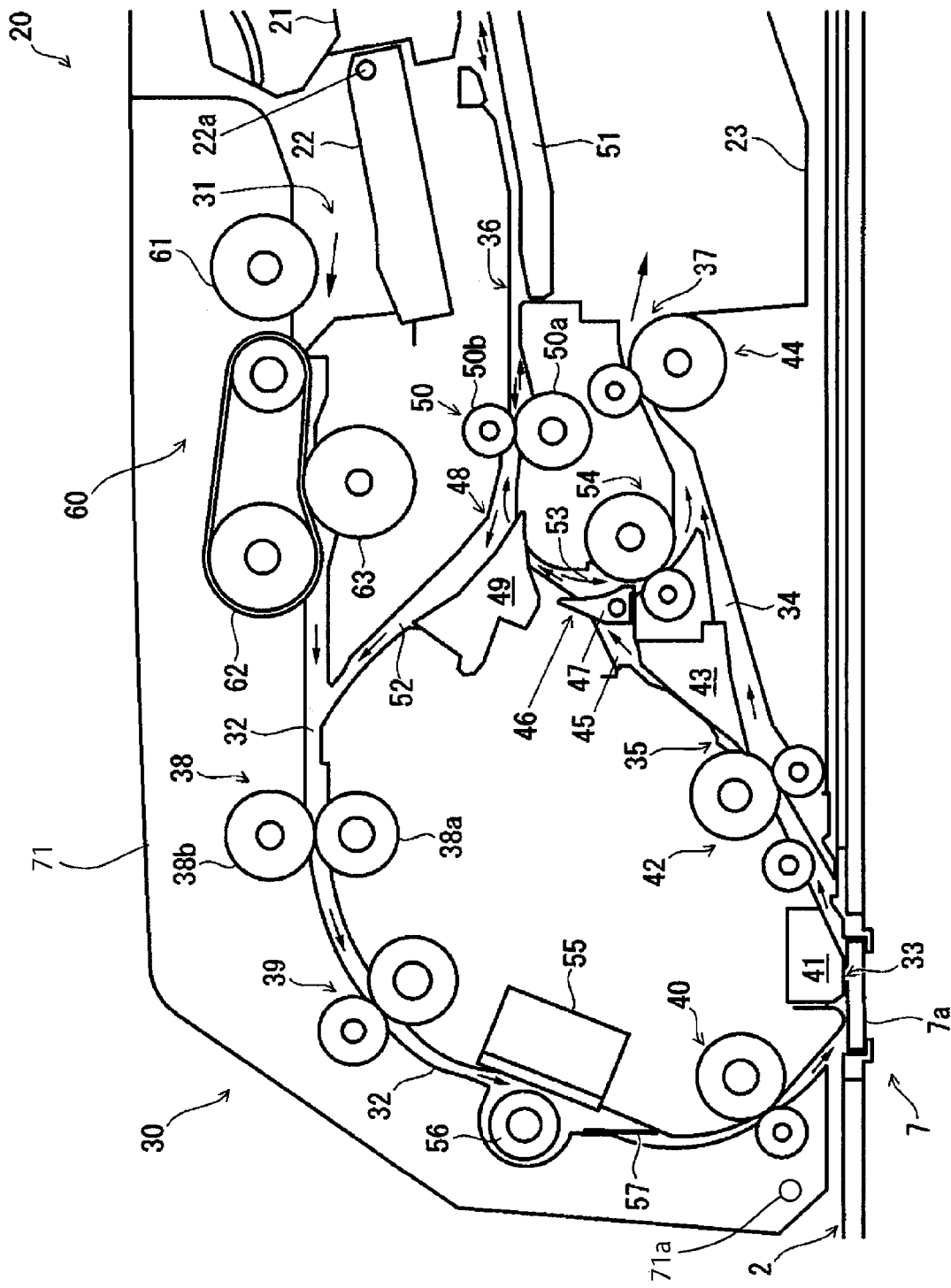

[FIG.4]
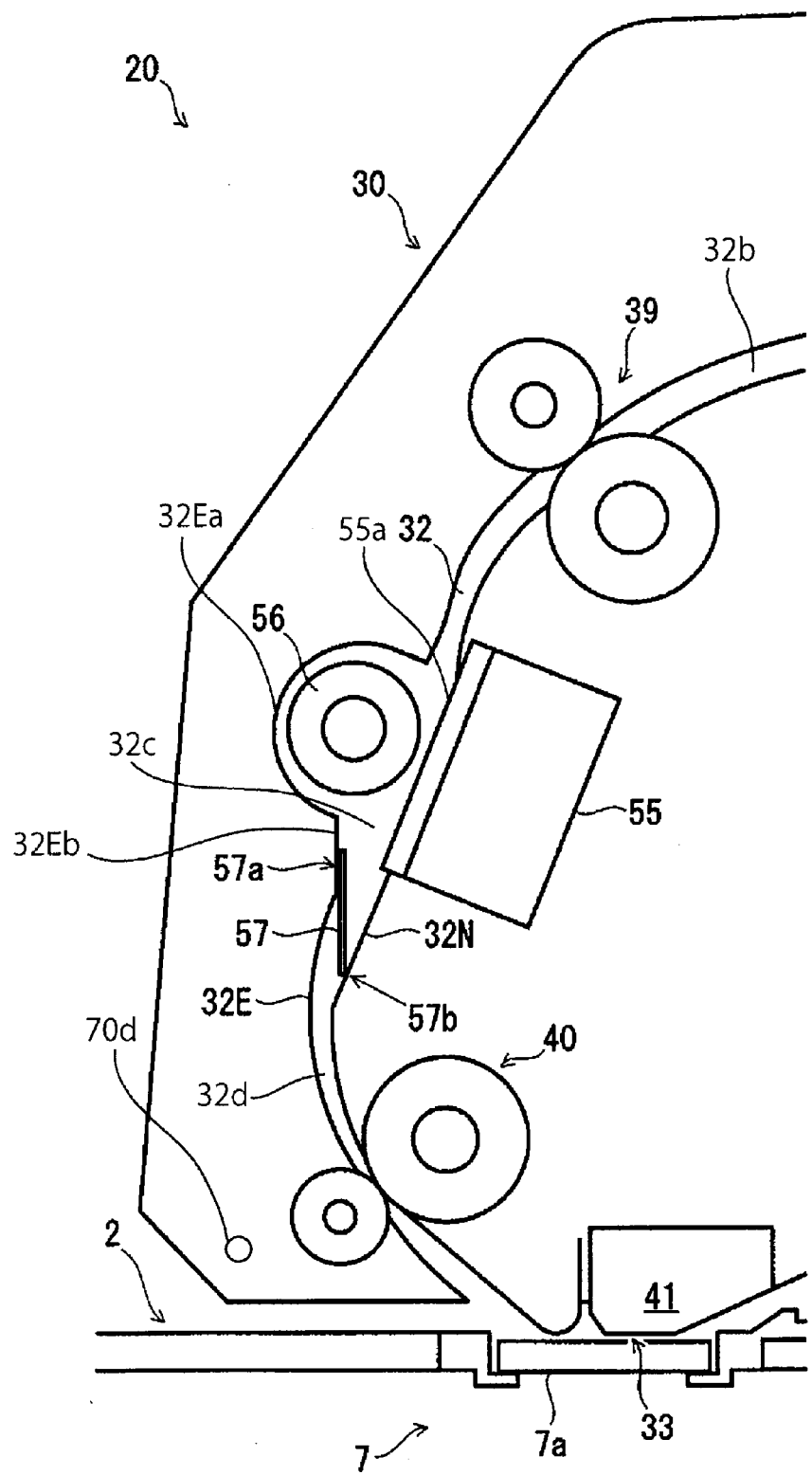

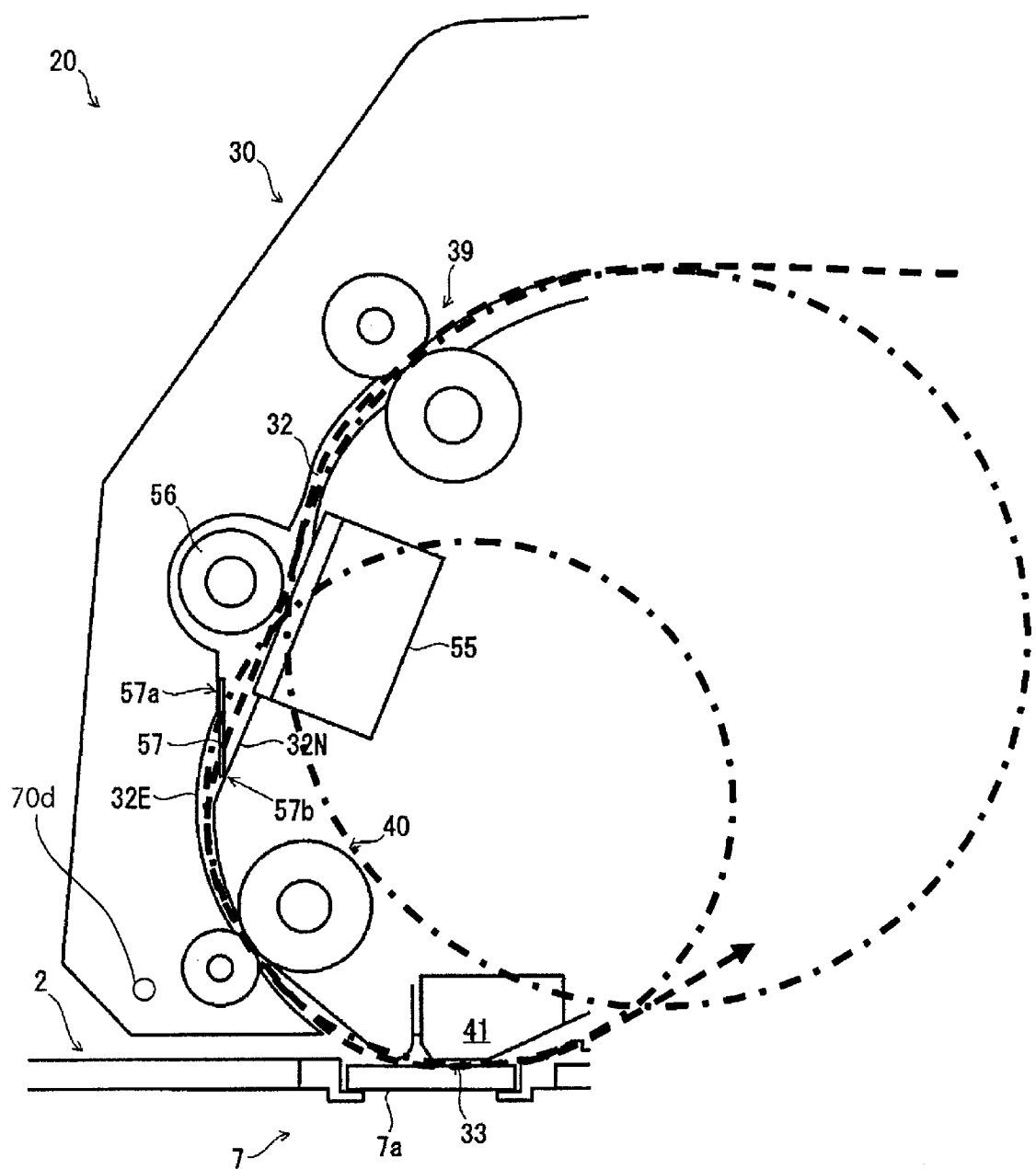
[FIG.5]

[FIG.6]
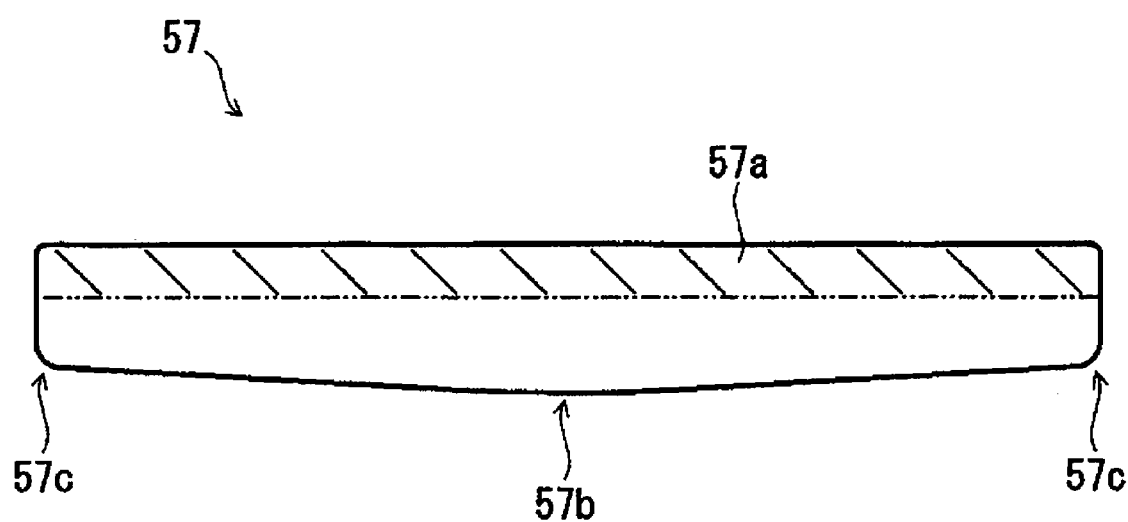

DOCUMENT FEEDING DEVICE AND IMAGE FORMING APPARATUS INCLUDING THE SAME

BACKGROUND

1. Field of the Invention

The present invention relates to a document feeding device that feeds documents and that can be used with image forming apparatuses such as copying machines, printers, facsimiles, and scanners. The present invention also relates to an image forming apparatuses having the document feeding device.

2. Description of the Related Art

Some image forming apparatuses are provided with a document feeding device that automatically feeds a plurality of documents, one at a time to a document reading section. A typical document feeding device is mounted at the top of the image forming apparatus.

The document feeding device separates documents that are stacked on a document tray one at a time from the uppermost one, and feeds the separated document to a document reading section. An image on a surface of the document is read by the document reading section and the document is then ejected onto a document output tray provided on the most downstream side of a document feeding path. These operations need to be performed in a limited amount of space.

To achieve size reduction of the document feeding device, a document conveying path extending from the document tray to the document output tray, via the document reading section, often has a curved shape. The document conveying path also includes a conveying guide member for forming a document feeding space, and conveying rollers for nipping and feeding the document.

When a document passes through the curved document conveying path, it also curves along the document conveying path against its elasticity. Hence, when an upstream end of the document in the feeding direction (the rear end in the feeding direction) is released from the nip between the conveying rollers or passes through a portion where a surface of the conveying guide member is at a retracted position, it can collide with the surface of the conveying guide member due to its elasticity. The impact of the end of the document with the conveying guide member can cause much noise when the elasticity of the document is great.

Devices for preventing the impact of the upstream end of a document and the conveying guide member during feeding have been proposed heretofore. For example, in a sheet feeding mechanism, a buffer plate comprised of sponge or rubber is provided between two conveying guide members arranged in the feeding direction.

In this sheet conveying mechanism, even when, due to its elasticity, the upstream end, in the feeding direction, of a sheet passing between the two conveying guide members collides with the conveying guide members the impact of the collision is absorbed by the buffer plate, so that the noise is reduced.

Elasticity of the document (sheet) varies according to the type, material, and size of the document, and how the document bends. Even when the type, material, and size of the document are not different, the characteristics of the document, such as elasticity and coefficient of friction, can vary greatly according to changes in the ambient environment, for example, in temperature or humidity. In this situation, it is difficult to estimate which portion of the document conveying surface of the conveying guide member the upstream end of the document will collide with and what noise will be caused by the impact.

Accordingly, in the above-described sheet conveying mechanism, it is necessary to use the buffer plate across a wide area. This requirement tends to greatly increase the development period and cost. Hence, it is desired that the document not collide with the document conveying surface of the conveying guide member.

SUMMARY

A document feeding device according to an embodiment of the invention includes: a sheet supply tray on which a plurality of documents are placed; a sheet supply section for feeding the documents one at a time from the sheet supply tray; a conveying path for guiding each of the fed documents, the conveying path comprising two conveying surfaces facing front and back sides of the document, and having a curved portion; a conveying section provided in the conveying path to clamp and feed the document; an output tray on which the document passing through the conveying path is placed; and a pressing member extending in a document width direction in the conveying path upstream of the curved portion, the pressing member extending in a conveying space from one of the conveying surfaces toward the other conveying surface.

Additional features and advantages are described herein, and will be apparent from the following Detailed Description and the figures.

BRIEF DESCRIPTION OF THE FIGURES

In the accompanying drawings:

FIG. 1 is a schematic front vertical sectional view of an image forming apparatus on which a document feeding device according to an embodiment of the present invention is mounted;

FIG. 2 is a schematic front vertical sectional view of the document feeding device shown in FIG. 1;

FIG. 3 is a front vertical sectional view of a document conveying section in the document feeding device shown in FIG. 2;

FIG. 4 is a partly enlarged front vertical sectional view of a contact image sensor, and its surroundings, in the document conveying section shown in FIG. 3;

FIG. 5 is an explanatory view showing the movement of a document passing near the contact image sensor shown in FIG. 4; and FIG. 6 is a front view of only a pressing member.

DETAILED DESCRIPTION

An embodiment of the present invention will now be described below with reference to FIGS. 1 to 6.

First, with reference to FIG. 1, descriptions will be given of a general configuration and an image output operation of an image forming apparatus having a copying function, on which a document feeding device according to an embodiment of the present invention is mounted. FIG. 1 is a schematic vertical sectional front view of the image forming apparatus. In FIG. 1, arrows shown by solid lines indicate a conveying path and a conveying direction of a sheet, and an arrow shown by a dot dash line indicates a laser light L.

As shown in FIG. 1, sheet supply cassettes 3 are provided at an inner lower part of a main body 2 of an image forming apparatus 1. Each sheet supply cassette 3 stores a stack of sheets P, such as cut sheets of paper. The sheets P are separated and fed one at a time toward the upper left side of the sheet supply cassette 3 in FIG. 1. The sheet supply cassette 3 can be pulled out horizontally from the front side of the main body 2.

In the main body 2 and on the left side of the sheet supply cassettes 3, a first sheet conveying section 4 is provided. The first sheet conveying section 4 extends substantially vertically along a left side face of the main body 2. The first sheet conveying section 4 receives a sheet P, that is fed from the sheet supply cassette 3, and vertically feeds the sheet P upwardly to a transfer section 10 along the left side face of the main body 2.

A manual sheet feeding section 5 is provided above the sheet supply cassettes 3 and at a right side face of the main body 2 opposite the left side face where the first sheet conveying section 4 is provided. In the manual sheet feeding section 5, for example, sheets P having a size that is different from the size of the sheets in the sheet supply cassettes 3, such as thick paper or OHP sheets are typically placed.

A second sheet conveying section 6 is provided on the left side of the manual sheet feeding section 5, just above the sheet supply cassettes 3. The second sheet conveying section 6 extends from the manual sheet feeding section 5 in a substantially horizontal direction so as to meet the first sheet conveying section 4. The second sheet conveying section 6 receives a sheet P that is fed from the manual sheet feeding section 5, and feeds the sheet P in a substantially horizontal direction to the first sheet conveying section 4.

An image reading device 7 is provided at the top of the main body 2 of the image forming apparatus 1. A contact glass 7a, on which a document to be read is placed, is located on an upper surface of the image reading device 7. Although not shown, the image reading device 7 includes therein an exposure scanning mechanism for irradiating and scanning an image on the contact glass 7a, an optical lens for focusing an image obtained from the exposure scanning mechanism, and a CCD for converting the focused image into electrical signals. A document feeding device 20 is positioned on the image reading device 7 in a manner such as to face the contact glass 7a. The document feeding device 20 is attached to the image reading device 7 by a hinge mechanism provided at the rear end so that a front side thereof can open upwardly. For copying, the user stacks documents in the document feeding device 20 so that the document feeding device 20 faces the contact glass 7a. The document feeding device 20 separates and feeds the documents one at a time, and exposes the fed document with the exposure scanning mechanism of the image reading device 7 stopped near the left end, thus reading an image on the document.

Reading of the document image, that is, printing is initiated through the use of a control panel (not shown) provided at the top of the main body 2 and on the front side of the image reading device 7. The user can input and set printing conditions, such as the sheet size, enlargement or reduction, as well as two-sided printing, from the control panel.

Image data on the document read by the image reading device 7 is supplied to an exposure device 8 provided above the second sheet conveying section 6 and in the center of the main body 2. The exposure device 8 emits a laser light L, that is controlled according to the image data, toward an image forming section 9.

The image forming section 9 and the transfer section 10 are provided above the first sheet conveying section 4 and on the left side of the exposure device 8. In the image forming section 9, an electrostatic latent image, corresponding to the document image, is formed by the laser light L emitted from the exposure device 8, and is developed using toner into a toner image. The toner is supplied from a toner container 11 positioned above the exposure device 8 to the image forming section 9. The transfer section 10 transfers the toner image formed by the image forming section 9 onto an unprinted sheet P that is supplied in synchronization by the first sheet conveying section 4.

A fixing device 12 is positioned above the transfer section 10. The sheet P on which the unfixed toner image is transferred by the transfer section 10 is fed to the fixing device 12, where the toner image is fixed by heat and pressure applied from a heating roller and a pressure roller.

A sheet guide device 13 is positioned above the fixing device 12. When two-sided printing is not performed, the sheet P supplied from the fixing device 12 is ejected from the sheet guide device 13 into an inner sheet output section 14 located in the main body 2 of the image forming apparatus 1.

An output section of the sheet guide device 13, from which the sheet P is ejected into the inner sheet output section 14, functions as a switchback section 15. When two-sided printing is performed, the feeding direction of the sheet P supplied from the fixing device 12 is changed by the switchback section 15. Then, the sheet P passes through the sheet guide device 13, is fed downward through a two-sided printing sheet conveying path 16 located on the left side of the fixing device 12 and the transfer section 10, and is then fed again to the transfer section 10 via the first sheet conveying section 4.

Next, the configuration of the document feeding device 20 mounted on the upper surface of the main body 2 will be briefly described with reference to FIG. 2. FIG. 2 is a schematic front vertical sectional view of the document feeding device 20. In FIG. 2, arrows shown by solid lines indicate a conveying path and a conveying direction of documents.

Referring to FIG. 2, the document feeding device 20 includes a document tray 21, a lift plate 22, a document conveying section 30, and a document output tray 23.

The document tray 21 is positioned at the top of the document feeding device 20. Documents can be placed on the document tray 21 from above. In an embodiment of the present invention, the document feeding device 20 is designed so that up to about 200 sheets of plain paper can be placed on the document tray 21. The document tray 21 inclines downwardly from the upstream side to the downstream side in the document conveying direction, that is, from the right side to the left side in FIG. 2.

The lift plate 22 is positioned downstream of the document tray 21 in the document feeding direction and is formed by a plate-shaped member having a flat face extending along a document holding surface of the document tray 21. The lift plate 22 has a free end at a downstream end, and can turn in a vertical plane along the document conveying direction on a pivot 22a that extends in a substantially horizontal direction in an upstream portion thereof. During document supply, the lift plate 22 is turned on the pivot 22a by a drive mechanism (not shown) and is biased upward so as to bring a downstream end of a document placed on the document tray 21 into contact with a sheet supply section 60 provided thereabove.

The document conveying section 30 is provided with a document supply section 31 and sheet supply section 60 at a downstream end of the document tray 21 in the document conveying direction. The sheet supply section 60 separates documents placed on the document tray 21 one at a time from the uppermost one, and supplies the documents into the document conveying section 30 via the document supply section 31. On a downstream side of the document supply section 31, a first document conveying path 32 extends toward the interior of the document conveying section 30.

A downstream end of the first document conveying path 32 extends to a bottom surface of the document feeding device 20, where a document reading section 33 is provided. Next to the first document conveying path 32, a second document conveying path 34 extends from the document reading section 33. The document fed to the document reading section 33 then moves downstream from the first document conveying path 32 to the second document conveying path 34, that is, from the left to the right at the document reading section 33 in FIG. 2. During this movement, an image on a lower surface of the document is read by the image reading device 7 provided therebelow in the main body 2 (see FIG. 1).

A document switching section 35 is provided downstream of the document reading section 33 in the second document conveying path 34. When it is necessary to read images on both front and back sides of the document, the document that has reached the document switching section 35 is delivered above the second document conveying path 34. Then, the feeding direction of the document is reversed by a document reversing section 36 located downstream in the document conveying direction. After the feeding direction is reversed, the document passes over the document switching section 35, and enters the first document conveying path 32 upstream of the document reading section 33, where an image on a second surface of the document is read by the document reading section 33.

A document output section 37 is provided downstream of the document switching section 35 and at a downstream end of the second document conveying path 34. After the image reading is completed, the document is ejected from the document output section 37 into the document output tray 23.

The document output tray 23 is positioned below the document tray 21. These trays are arranged one above the other. The document ejected into the document output tray 23 can be taken out from the front side of the document feeding device 20. The document output tray 23 is designed to have sufficient space to store as many documents as can be placed on the document tray 21. Hence, the height of the main body of the document feeding device 20 is determined by the dimensions of the document output tray 23, the document reversing section 36, and the document tray 21. The document conveying section 30 is also designed according to the height of the main body.

The document tray 21 and the document output tray 23 have opposite document feeding directions. That is, in FIG. 2, the document tray 21 feeds out the document to the left, and the document output tray 23 ejects the document to the right. Thus, the document supply section 31 and the document output section 37 are located on the same side of the trays with respect to the document reading section 33, that is, on the left side of FIG. 2. As shown in FIG. 2, the first document conveying path 32 and the second document conveying path 34, extending from the document supply section 31 to the document output section 37 via the document reading section 33, are U-shaped (viewed from a horizontal direction), that is, are curved in a sideways U-shape (as viewed from the front side).

By virtue of the above-described configuration, the document feeding device 20 separates and feeds documents staked on the document tray 21 one at a time into the document conveying section 30, and ejects the fed document onto the document output tray 23 after an image on the document is read by the document reading section 33.

The structure of the document conveying section 30 in the document feeding device 20 will now be described with reference to FIGS. 3 to 6 in addition to FIG. 2. FIG. 3 is a front vertical sectional view of the document conveying section 30, FIG. 4 is a partly enlarged front vertical sectional view of a contact image sensor and its surroundings in the document conveying section 30, FIG. 5 is an explanatory view showing the movement of a document passing near the contact image sensor, and FIG. 6 is a front view of a pressing member alone. In FIG. 3, arrows shown by solid lines indicate the document feeding path and feeding direction. Details of the document conveying section 30 will now be described below.

As described above, the document conveying section 30 includes the document supply section 31 and the sheet supply section 60 at the downstream end of the document tray 21 in the document conveying direction (see FIG. 3). As shown in FIG. 3, the first document conveying path 32 extends downward on the downstream side of the document supply section 31.

The sheet supply section 60 is provided in an upper portion at almost the center (in the document width direction) perpendicular to the document conveying direction. The sheet supply section 60 includes a pickup roller 61, a sheet supply belt 62, and a separation roller 63.

The pickup roller 61 is positioned immediately downstream of the document supply section 31. During the supply of documents, downstream portions of documents placed on the document tray 21 are lifted by the lift plate 22, so that a downstream end of the uppermost document comes into contact with the pickup roller 61 from below. The uppermost document is fed to the sheet supply belt 62 by the pickup roller 61, and is fed into the document conveying section 30 by the sheet supply belt 62.

On the downstream side of the pickup roller 61, the sheet supply belt 62 is positioned such that a lower surface thereof extends into the first document conveying path 32. Further, the sheet supply belt 62 is wound around two pulleys and rotates in a clockwise direction to feed the document from the document supply section 31 to the left in FIG. 3. The separation roller 63 is positioned below and in contact with the sheet supply belt 62. The document passes through a conveying nip formed by the contact between the sheet supply belt 62 and the separation roller 63.

When a plurality of documents simultaneously enters the conveying nip, only the uppermost one of the documents is fed out by the sheet supply belt 62. The separation roller 63 prevents the lower document, or documents, from being fed out; double feeding is thereby avoided.

A pair of registration rollers 38, a pair of conveying rollers 39, and a pair of conveying rollers 40 are located downstream of the sheet supply section 60 on the first document conveying path 32. The registration rollers 38 comprise registration rollers 38a and 38b that are in pressing contact with each other and correct any skew feeding and feed the document toward the document reading section 33 at appropriate timing so as to achieve precise reading.

The document reading section 33 is positioned downstream of the conveying rollers 40. The first document conveying path 32 extends from the document supply section 31 to the document reading section 33 via the sheet supply section 60, the registration rollers 38, and the conveying rollers 39 and 40 in a curved form as if it turned counterclockwise (as viewed from a front side). Hence, the first document conveying path 32 extends to the left side and lower side upstream of the document reading section 33 in FIG. 3. Next to the first document conveying path 32, the second document conveying path 34 extends toward the diagonally upward right side and downstream of the document reading section 33 to the document output section 37 and the document output tray 23.

The document reading section 33 is provided with a reading guide member 41. The reading guide member 41 faces the contact glass 7a of the image reading device 7 in the main body 2 located below the document reading section 33. The reading guide member 41 extends, in a front to rear direction of the document feeding device 20 and has a downwardly convex portion for guiding the document. When the document feeding device 20 is closed on the image reading device 7, the reading guide member 41 guides a document so that the document is fed between the reading guide member 41 and the contact glass 7a while being in contact with the contact glass 7a.

The document fed to the document reading section 33 moves from the first document conveying path 32 to the second document conveying path 34, that is, from the left to the right below the reading guide member 41 in FIG. 3, passing over the contact glass 7a. During this, an image on the document is read by a reading unit (not shown) provided below the contact glass 7a.

A pair of conveying rollers 42 and a document switching section 35 are positioned downstream of the document reading section 33 in the second document conveying path 34. The document switching section 35 is provided with a switch guide 43 capable of turning in a vertical plane on a pivot (not shown) that extends substantially horizontally in a front to rear direction. The switch guide 43 extends in the front to rear direction of the document feeding device 20. To easily distribute the document, an upstream end of the switch guide 43 in the document feeding direction has a wedge like shape, as viewed from the front side of FIG. 3. The switch guide 43 is driven by a solenoid (not shown) that functions as a driving device provided behind the switch guide 43, whereby the switch guide 43 changes its position so an upstream end swings vertically in the document conveying direction.

The document output section 37 and a pair of document ejection rollers 44 are positioned on the downstream side of the document switching section 35 and at a downstream end of the second document conveying path 34. After image reading, the document is ejected from the document output section 37 onto the document output tray 23 (see FIG. 2) by the document ejection rollers 44.

Downstream of the document switching section 35, a third document conveying path 45 extends diagonally upwardly right, from the direction of the second document conveying path 34, extending substantially to the right in FIG. 3. When it is necessary to read images on both sides of a document, the position of the switch guide 43 of the document switching section 35 is turned downwardly, and the document is fed from the midpoint of the second document conveying path 34 into the document reversing section 36 via the third document conveying path 45 after an image on the first side of the document is read by the document reading section 33.

A first document branch portion 46 is located downstream of the document switching section 35 in the third document conveying path 45. The first document branch portion 46 is positioned closer to the document output tray 23 than the third document conveying path 45. The first document branch portion 46 has a first branch guide 47 at a point between where the third document conveying path 45 and the fifth document conveying path 53 meet.

The first branch guide 47 extends in a front to rear direction of the document feeding device 20 (in the document width direction) and an end thereof downstream of the third document conveying path 45 (that is, an upper end) has a wedge like shape as viewed from the front side. The first branch guide 47 is supported with its lower portion coupled to a frame of the document feeding device 20 by a spring member (not shown). The upper end of the first branch guide 47 can swing on the support portion in a vertical plane extending in the document conveying direction.

The first branch guide 47 is positioned so that the upper end thereof blocks the third document conveying path 45. The spring member supporting the first branch guide 47 provides a force that can be elasticity changed due to contact of the document with the first branch guide 47. Thus, when the document passes through the third document conveying path 45, the first branch guide 47 changes position to swing the downstream end, that is, the upper end, to the right in FIG. 3. When the document has passed by the first branch guide 47, or when the document is not in contact with the first branch guide 47, the first branch guide 47 swings its upper end to the left, and maintains the position shown in FIG. 3, that is, a position such as to block the third document conveying path 45.

A second document branch portion 48 is positioned at the downstream end of the third document conveying path 45 and between the third document conveying path 45 and the document reversing section 36. The second document branch portion 48 is provided with a second branch guide 49. The second branch guide 49 extends in a front to rear direction of the document feeding device 20 (in the document width direction), and an end thereof downstream of the third document conveying path 45 (that is, the right end in FIG. 3) has a wedge like shape as viewed from the front side of FIG. 3. Further, the second branch guide 49 has, on the left side, a pivot (not shown) extending substantially horizontally in a front to rear direction. The second branch guide 49 can pivot in a vertical plane provided in the document conveying direction.

The second branch guide 49 is positioned so that the right end thereof in FIG. 3 blocks the third document conveying path 45. Further, due to the weight of the second branch guide 49 it turns on the pivot due to contact of the document with the right end of the second branch guide 49. Thus, when the document passes through the third document conveying path 45, the second branch guide 49 changes its position to swing the downstream end (that is, the right end) upwardly in FIG. 3. When the document has passed by the second branch guide 49, or when the document is not in contact with the second branch guide 49, due to gravity, the right end of the second branch guide 49 swings downwardly, and holds the position shown in FIG. 3 due to a stopper (not shown), that is, a position to block the third document conveying path 45.

The document reversing section 36 is positioned downstream of the third document conveying path 45 and above a downstream portion of the second document conveying path 34, and includes a pair of reversing rollers 50 and a reversing tray 51.

The reversing rollers 50 are provided in the most upstream portion of the document reversing section 36, i.e., the farthest portion from the third document conveying path 45, and are formed by a reversing roller 50a and a following roller 50b that are in contact with each other to form a conveying nip. The reversing roller 50a is rotated clockwise and counterclockwise in FIG. 3 by a motor (not shown). The following roller 50b is in pressing contact with the reversing roller 50a from above. The reversing tray 51 is located just below the document tray 21 with a relatively small space therebetween, and extends upward, similar to the document tray 21 (see FIG. 2)

The document reversing section 36 temporarily feeds, onto the reversing tray 51, a leading end portion of the document which has been fed from the left to the right in FIG. 3 through the third document conveying path 45. When a rear end portion of the document reaches the reversing rollers 50, the rotation of the reversing roller 50a is reversed so that the document is held at the conveying nip between the reversing roller 50a and the following roller 50b, thus reversing the feeding direction of the document from the rightward direction to the leftward direction.

In FIG. 3, a fourth document conveying path 52 is provided on the left side of the document reversing section 36 and the second document branch portion 48 and above the third document conveying path 45 and the document reading section 33. The fourth document conveying path 52 extends to the left in FIG. 3 from the document reversing section 36 and the second document branch portion 48, and meets a portion of the first document conveying path 32 upstream of the registration rollers 38. Thus, when the document completely passes through the second document branch portion 48 and its feeding direction is reversed by the document reversing section 36, the document passes through the fourth document conveying path 52, is fed again into the first document conveying path 32 on the upstream side of the document reading section 33, and reaches the document reading section 33, where an image on a second side is read.

The fifth document conveying path 53 is positioned to branch off from the middle of the third document conveying path 45 at the first document branch portion 46 upstream of the second document branch portion 48 from which the fourth document conveying path 52 branches off. The fifth document conveying path 53 branches downwardly from the third document conveying path 45 at the first document branch portion 46, and meets the second document conveying path 34 at a downstream side of the document switching section 35 having the switch guide 43. A pair of conveying rollers 54 are located in the middle of the fifth document conveying path 53. After images on both sides of each of the documents are read, the fifth document conveying path 53 feeds the documents into the document reversing section 36 and switches back the documents, thereby feeding the documents toward the document output tray 23 of the second document conveying path 34 so that the documents are ejected onto the document output tray 23 in the same order with the sides being oriented the same as when the documents were initially placed on the document tray 21.

Instead of reading images on both sides of the document by the document reading section 33, an image on the second side may be read with a box-shaped contact image sensor 55 serving as an image reading sensor in an image reading section provided between the conveying rollers 39 and the conveying rollers 40 in the first document conveying path 32.

In the document feeding device 20 using this contact image sensor 55, as shown in FIG. 3, when a document passes through a region of the first document conveying path 32 between the conveying rollers 39 and the document reading section 33, the contact image sensor 55 reads an image on the second side of the document. The document reading section 33 then reads an image on the first side. Thus, images on both sides of the document can be read by feeding the document only once through the first document conveying path 32 and the second document conveying path 34. This eliminates the need to reverse the document; therefore, the above-described structure for reversing the document is not necessary. In this situation, the contact image sensor 55 may be placed downstream of the document reading section 33, not at the position shown in FIG. 3.

The above-described two-sided reading will be more specifically described with reference to FIG. 3. The contact image sensor 55 is formed by a box-shaped member extending in the document width direction. One surface of the contact image sensor 55 is a flat reading surface 55a which is covered with a transparent glass and below which an exposure light source and an image pickup element are arranged. The contact image sensor 55 exposes a document passing in close contact with the reading surface 55a and converts an image into electrical signals. While the contact image sensor 55 is a compact unit, it is incapable of properly reading a document that is not in close contact with the reading surface 55a. In the document feeding device 20 shown in FIG. 3, the reading surface 55a of the contact image sensor 55 faces a document feeding space in the first document conveying path 32. Further, a counter conveying roller 56 faces the reading surface 55a with a space therebetween. The space is set to allow the document to pass without contacting the reading surface 55a. The counter conveying roller 56 rotates in the document feeding direction at a peripheral speed equal to the document feeding speed. When the document passes through the document feeding space between the reading surface 55a and the counter conveying roller 56, an image thereon is read by the reading surface 55a. The counter conveying roller 56 is also used as a reference during shading correction of the contact image sensor 55.

FIG. 4 is a partly enlarged front vertical sectional view of the contact image sensor 55 and its surroundings in the document feeding device 20. The sheet supply section 60 and the document conveying section 30 are provided in the left part of a main body 70 of the document feeding device 20. A conveying cover 71 is provided that is molded from a resin material and has a substantially L-shaped cross section defined by a top face and a left side face. The conveying cover 71 covers outer sides of the sheet supply section 60 and the document conveying section 30. An outer surface of the conveying cover 71 also functions as an exterior cover and an inner surface thereof includes an outer conveying guide member 32E of conveying guide members that face each other to define the first document conveying path 32. Attached to the conveying cover 71, are the pickup roller 61, the sheet supply belt 62, the registration roller 38b, one of the conveying rollers 39, one of the conveying rollers 40, the counter conveying roller 56, and a pressing member 57.

One end of the L-shaped conveying cover 71 is supported on the main body 70 so as to turn on a pivot 71a at the lower left, and the other end is provided with a hook (not shown) that engages the main body 70. When the conveying cover 71 is closed, the hook engages the main body 70, the first document conveying path 32 is formed, and the sheet supply belt 62, the registration roller 38b, and the conveying rollers 39 and 40 are brought into contact with corresponding opposing members. When the conveying cover 71 is opened by releasing the hook, the entire first document conveying path 32 is opened. This allows one to easily remove a document jammed in the first document conveying path 32. Further, since the reading surface 55a of the contact image sensor 55 and the counter conveying roller 56 are also exposed, dirt can be easily cleaned off.

FIG. 5 shows the movement of a document that passes near the contact image sensor 55. To properly feed the document, it is better to reduce the number of curved portions in the conveying path and to increase the radius of curvature of the curved portions. In the structure of the first document conveying path 32, in consideration of other functions of the image reading device 7, the position of the document reading section 33 is limited to the position shown in FIG. 5. Further, the reading surface 55a of the contact image sensor 55 has a flat surface with a given width. The upstream and downstream feeding paths need to merge so that the document can be fed on the flat surface.

In light of these conditions, the first document conveying path 32 includes, from the upstream side, a horizontal conveying path 32a extending substantially horizontally in the sheet supply section 60, a first curved portion 32b, the reading surface 55a of the contact image sensor 55, a linear conveying path 32c, and a second curved portion 32d (also see FIG. 3).

The conveying paths and curved portions 32a to 32d are defined by an outer conveying guide member 32E provided in the conveying cover 71 and an inner conveying guide member 32N provided in the main body 70. In FIG. 5, the movement of the fed document is shown by a broken line, and circles indicating the radii of curvature of the first and second curved portions 32b and 32d are shown by the line including a dot and a dash.

The first curved portion 32b has a relatively large radius of curvature. The first curved portion 32b extends from the horizontal conveying path 32a, and meets the flat reading surface 55a of the contact image sensor 55 slightly upstream of the counter conveying roller 56 and at a gentle angle. The leading end of the document is thereby smoothly fed into the space at the counter conveying roller 56 while being in tight contact with the reading surface 55a, and remains so until the rear end of the document passes by the counter conveying roller 56.

In the linear conveying path 32c downstream of the contact image sensor 55, the inner conveying guide member 32N extends in a straight line parallel to the reading surface 55a and an upstream end thereof lies slightly back from the reading surface 55a so that the leading end of the document will not be caught by the upstream end. The outer conveying guide member 32E includes a depression 32Ea that recedes to maintain a space from the peripheral surface of the counter conveying roller 56, and an inclined surface 32Eb positioned on the downstream side in the document feeding direction to prevent the leading end of the document from entering the space between the depression 32Ea and the counter conveying roller 56. On the upstream side, the inclined surface 32Eb inclines away from the inner conveying guide member 32N. A pressing member 57 is attached to the inclined surface 32Eb.

FIG. 6 is a plan view illustrating only the pressing member 57. The pressing member 57 is formed of an elastic synthetic resin having a low coefficient of friction and a high resistance to friction, such as PET (polyethylene terephthalate), and extends in the document width direction perpendicular to the document feeding direction. The pressing member 57 is attached, at a diagonally shaded support portion 57a, to the inclined surface 32Eb of the outer conveying guide member 32E using two-sided tape. A free end portion of the pressing member 57 extends into the conveying path, and a leading end thereof is in contact with a linear portion of the inner conveying guide member 32N. The length of the pressing member 57 (in a protrusion direction, in which the pressing member 57 extends in the document conveying space) gradually increases from both ends 57c toward a widthwise center portion 57b. A leading end portion of the center portion 57b is in contact with the document feeding surface of the inner conveying guide member 32N. In this embodiment, the document feeding device 20 can feed documents having widths of up to about 300 mm. The pressing member 57, in an embodiment, is formed from PET film having a thickness of 0.1 mm, a length in the width direction of about 160 mm, and a maximum length in the protrusion direction of about 14 mm. The difference in length in the protrusion direction between the center portion and both ends is about 4 mm. The leading end portion of the pressing member 57 peaks at the center and has gently angled ridges at both sides, (i.e., a mountain shape). Alternatively, the leading end portion may be arc-shaped. The leading end portion of the pressing member 57 is in contact with the inner conveying guide member 32N at an angle of about 30 degrees.

Only the center portion of the leading end of the document is inserted in the contact portion between the pressing member 57 and the inner conveying guide member 32N. Any impact that occurs during insertion is therefore reduced as compared to when the entire leading end (in the width direction) is inserted. This reduces any adverse effect to the reading function that is performed by the reading surface 55a. Further, when the leading end of the document enters the downstream second curved portion 32d and collides with the conveying guide surface, adverse effect on reading by the reading surface 55a is also avoided because the document is pressed by the pressing member 57. Moreover, when a rear end of the document (upstream end in the conveying direction) passes by the counter conveying roller 56, it is prevented by the pressing member 57 from moving up due to its elasticity and colliding with the outer conveying guide member 32E, in the alternative, the impact of the collision is reduced. This avoids any noise resulting from the impact. As the rear end of the document passes by the pressing member 57, it gradually moves away from the pressing member 57 from both widthwise sides. Hence, when the rear end of the document passes by the pressing member 57, the impact caused when the document is raised and collides with the conveying guide surface because of its elasticity is reduced, and noise due to the impact is also reduced. Further, when the rear end of the document passes and the pressing member 57 comes again into contact with the inner conveying guide member 32N, the guide member 57 gradually contacts the inner conveying guide member 32N from almost the center portion. This minimizes noise due to the impact.

To feed the document to the horizontal surface of the document reading section 33, in as horizontal a direction as possible, the downstream end of the second curved portion 32d is in contact with the document reading section 33. With this structure, the document can properly pass through the document reading section 33 and an image on the surface of the document can be optimally read. Moreover, an upstream end of the second curved portion 32d is in contact with the outer conveying guide member 32E. Because the pressing member 57 is deformed due to the elasticity of a typical document, the pressing member 57 is positioned so as to extend along the curved portion 32d in a deformed state. This allows optimal feeding of the document and reduces the adverse effect on the document reading section 33.

When the contact angle of the pressing member 57 with the conveying guide surface is small, the force that presses the document is too weak, and the above-described advantages are not obtained. In addition, there is a concern that the contact area with the document will increase, increasing the resistance in feeding the document, and that noise will be caused due to sliding contact. Conversely, when the contact angle is great, the pressing force increases, and the influence of variations in length in the protrusion direction increases. This may cause problems, for example, the document may be strongly pressed increasing the conveying resistance, the document surface can be scratched, or sliding contact noise increases. In view of these, an optimal contact angle between the pressing member 57 and the conveying guide surface is preferably within the range of 20 to 45 degrees.

When the difference in length in the protrusion direction between the center portion and both ends of the pressing member 57 is too small, the contact area with the document increases. This makes it impossible to obtain the effects of reducing the sliding contact area and reducing feeding resistance and noise due to the sliding contact. In contrast, if the difference is large, the pressing member 57 contacts the document only near the center portion. The optimal difference in length of the protruding direction of the pressing member 57 between the center portion and both ends in the document width direction is about 2 to 4% of the width.

The pressing member 57 is attached to the pivotal conveying cover 71. When open, the conveying cover 71 moves away from the inner conveying guide member 32N opening the first document conveying path 32. Due to this structure, even when a document jams in the first document conveying path 32 during feeding, the jam can be easily removed without being hindered by the pressing member 57. Moreover, it is possible to prevent the pressing member 57 from being damaged during the jam removal operation.

As described above, the document feeding device 20 includes the pressing member 57 that extends into the document conveying space from the document conveying surface of the outer conveying guide member 32E having the counter conveying roller 56, of the two conveying guide members 32E and 32N opposing the front and back sides of the document, toward the document conveying surface of the inner conveying guide member 32N. The pressing member 57 extends in a document width direction perpendicular to the document feeding direction with the leading end thereof in contact with the document conveying surface of the inner conveying guide member 32N. Because of this, even when a document is released from the nip between the conveying rollers, or passes between the two conveying guide members provided in the document conveying direction in this portion, a large displacement of the document is avoided. This prevents the upstream end of the document, in the feeding direction, from colliding with the document conveying surface of the conveying guide member due to the elasticity of the document. Even when the pressing member 57 is small, it prevents contact of the document with the conveying guide member. The increase in cost resulting from the use of the pressing member 57 is small. Therefore, the document feeding device 20 prevents the upstream end of the document in the feeding direction with the document conveying surface of the conveying guide member and reduces noise due to the impact of collision while keeping the cost down.

The length of the pressing member 57, in the direction of extension into the document conveying space, is longer at the center portion 57b than at both ends 57c. At the center portion 57b, the pressing member 57 contacts the document conveying surface of the inner conveying guide member 32N that faces the document conveying surface of the outer conveying guide member 32E having the pressing member 57, and therefore, the contact area between the document and the pressing member 57 can be minimized. Thus, even when frictional noise occurs between the document and the pressing member 57, it can be limited. It is therefore possible to prevent the impact of the document with the document conveying surface of the conveying guide member and to reduce frictional noise caused between the document and the pressing member 57.

The document feeding device 20 further includes the contact image sensor 55 and the counter conveying roller 56 that are provided in the first document conveying path 32. The contact image sensor 55 serves as an image reading sensor for reading the image on the document during feeding, and the counter conveying roller 56 faces the contact image sensor 55 without contact therewith across the document conveying space. The pressing member 57 is positioned downstream of the contact image sensor 55 and the counter conveying roller 56 in the document feeding direction and on the document conveying surface with the counter conveying roller 56, and extends in the document conveying space toward the document conveying surface with the contact image sensor 55. For this reason, even when the upstream end of the document in the feeding direction is apt to collide with the document conveying surface of the conveying guide member, because the space is provided between the contact image sensor 55 and the counter conveying roller 56 in order to obtain a proper reading by the contact image sensor 55, displacement of the document resulting from the collision can be minimized. It is therefore possible to prevent the impact of the upstream end of the document in the feeding direction with the document conveying surface of the conveying guide member and to reduce frictional noise due to the collision.

In an embodiment of the present invention, since the image forming apparatus 1 is provided with the document feeding device 20, it achieves noise reduction by preventing the upstream end of the document in the document feeding direction from colliding with the document conveying surface of the conveying guide member and minimizing frictional noise due to the collision.

Various modifications to the embodiments set forth above may be made. For example, while the image forming apparatus 1 including the document feeding device 20 is a monochromatic printing image forming apparatus using only black toner in the above-described embodiment, it is not limited to such a device. The present invention is also applicable, for example, tandem or rotary rack color printing image forming apparatus that includes an intermediate transfer belt and that can form an image by superimposing a plurality of colors. Alternatively, the document feeding device 20 may be attached to the image reading device 7 alone.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A document feeding device comprising:
a sheet supply tray on which a plurality of documents are placed;
a sheet supply section for feeding the documents one at a time from the sheet supply tray;
a conveying path for guiding each of the fed documents, the conveying path being defined by two conveying surfaces each facing a side of the document, and having a curved portion;
a conveying section positioned in the conveying path to clamp and fed the document;
an output tray on which the document passing through the conveying path is placed; and
a pressing member extending in a document width direction in the conveying path upstream of the curved portion, the pressing member extending in a conveying space from one of the conveying surfaces toward the other conveying surface, wherein a length of the pressing member in a protrusion direction in which the pressing member extends in the document conveying space is longer at a center portion than at both ends.

2. The document feeding device according to claim 1, wherein a leading end of the pressing member in the protrusion direction has a shape selected from the group consisting of an arc shape and mountain shape.

3. The document feeding device according to claim 1, wherein the pressing member is located on the one of the conveying surfaces so that at least the center portion of the pressing member is in contact with the other conveying surface.

4. A document feeding device comprising:
- a sheet supply tray on which a plurality of documents are placed;
- a sheet supply section for feeding the documents one at a time from the sheet supply tray;
- a conveying path for guiding each of the fed documents, the conveying path being defined by two conveying surfaces each facing a side of the document, and having a curved portion;
- a conveying section positioned in the conveying path to clamp and fed the document;
- an output tray on which the document passing through the conveying path is placed;
- a pressing member extending in a document width direction in the conveying path upstream of the curved portion, the pressing member extending in a conveying space from one of the conveying surfaces toward the other conveying surface;
- an image reading section positioned in the conveying path and having an image reading sensor for reading the document during conveying;
- a counter conveying roller facing the image reading sensor without contact therewith across the document conveying space;
- the pressing member is positioned downstream of the image reading sensor and the counter conveying roller in the document feeding direction and on one of the document conveying surfaces on which the counter conveying roller is provided; and
- the pressing member extends in the document conveying space toward the other document conveying surface on which the image reading sensor is provided.

5. The document feeding device according to claim 4, comprising:
- a document reading surface of the image reading sensor that is flat;
- the other document conveying surface adjacent to a downstream side of the document reading surface includes a linear portion extending substantially parallel to the document reading surface and a curved portion that is convex toward the image reading sensor on a downstream side of the linear portion; and
- the pressing member extends toward the linear portion.

6. An image forming apparatus attached a document feeding device, the document feeding device comprising:
- a sheet supply tray on which a plurality of documents are placed;
- a sheet supply section for feeding the documents one at a time from the sheet supply tray;
- a conveying path for guiding each of the fed documents, the conveying path being defined by two conveying surfaces facing front and back sides of the document, and having a curved portion;
- a conveying section provided in the conveying path to clamp and feed the document;
- an output tray on which the document passing through the conveying path is placed; and
- a pressing member extending in a document width direction in the conveying path upstream of the curved portion, the pressing member extending in a conveying space from one of the conveying surfaces toward the other conveying surface, wherein a length of the pressing member in a protrusion direction in which the pressing member extends in the document conveying space is longer at a center portion than at both ends.

7. A method for forming an image on a document comprising:
- feeding a document from a sheet supply tray on which a plurality of documents are placed one at a time;
- guiding each of the fed documents through a conveying path defined by two conveying surfaces facing front and back sides of the document, and having a curved portion, a conveying section being provided in the conveying path to clamp and feed the document; and
- contacting the sheets with a pressing member extending in a document width direction in the conveying path upstream of the curved portion, the pressing member extending in a conveying space from one of the conveying surfaces toward the other conveying surface, wherein a length of the pressing member in a protrusion direction in which the pressing member extends in the document conveying space is longer at a center portion than at both ends.

* * * * *